(12) United States Patent
Skokan et al.

(10) Patent No.: US 6,596,982 B1
(45) Date of Patent: Jul. 22, 2003

(54) REFLECTION SUPPRESSION IN FOCAL PLANE ARRAYS BY USE OF BLAZED DIFFRACTION GRATING

(75) Inventors: Mark R. Skokan, Garland, TX (US); Howard V. Kennedy, Dallas, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 07/988,622

(22) Filed: Dec. 9, 1992

(51) Int. Cl.[7] .................................................. G02B 5/18
(52) U.S. Cl. ..................... 250/216; 250/237 R; 359/371
(58) Field of Search ............................. 250/216, 237 R, 250/208.1; 359/566–573

(56) References Cited

U.S. PATENT DOCUMENTS 3,680,945 A * 8/1972 Sheridon .................... 359/571
5,048,925 A * 9/1991 Gerritsen et al. ........... 359/566
5,175,647 A * 12/1992 Gupta et al. ................ 359/566

* cited by examiner

Primary Examiner—Stephone B. Allen
(74) Attorney, Agent, or Firm—Baker Botts L.L.P.

(57) ABSTRACT

A reflection suppression system for suppressing reflection from scanned infrared focal plane arrays using a system of two or more blazed diffraction gratings in the path of radiations to the array.

16 Claims, 1 Drawing Sheet

REFLECTION SUPPRESSION IN FOCAL PLANE ARRAYS BY USE OF BLAZED DIFFRACTION GRATING

BACKGROUND OF THE INVENTION

1. Field of the Invention

This invention relates to a system for suppressing reflections from an infrared focal plane array.

2. Brief Description of the Prior Art

Optical countermeasure suppression (OCCM) on scanned infrared focal plane arrays (IRFPAs) has traditionally required the inclusion of a prismatic element to deflect incoming radiation out of the system optical axis, thereby preventing reflected (outgoing) radiation from passing back out through the system optics. This constitutes at least one part of every known suppression scheme.

The most common prismatic element or "optical wedge" includes an infrared-transmissive prism. This simple wedge has two kinds of aberration, namely chromatic and monochromatic. The chromatic aberrations are inversely proportional to the Abbe dispersion (a parameter of the material from which the gratings are made) while the monochromatic aberrations are caused by the difference in Snell's law of refraction for different portions of the ray bundle due to the relatively large height differences between "high" and "low" sides of the wedge. The chromatic aberrations are tolerable, however the monochromatic aberrations are not. The worst of the monochromatic aberrations is coma, with some astigmatism and spherical aberrations. The coma can be fairly well corrected for one image position by decentering an element in the imager. However it remains under- or over-corrected at other image positions. The spherical aberration is minimized by a focal shift and astigmatism does not become dominant until the image position is more than about 0.015 inches off-axis.

Current scanned focal planes extend no more than about 0.006 inch off-axis in the scan direction, but the next generation of time-delay-integrate (TDI) arrays will extend farther out to in excess of 0.040 inch off-axis. Furthermore, the requirement that the optics be decentered leads to a significant increase in system complexity with concomitant increases in cost and weight. It is therefore necessary to, in some way, avoid the coma problem to avoid the significant loss in resolution in the off-axis region beyond about 0.015 inch.

The only alternative solution to the optical wedge aberration difficulty of which applicants are aware is the use of binary optic elements or stepped gratings. This solution has two major problems associated therewith. The first problem is that a stepped grating is, at best, an approximation to a blazed grating. The degree of approximation required to satisfy the minimum requirements for this application still leads to undiffracted (transmitted) losses of at least 0.3 percent compared to the blazed grating. The second major problem is that highly sophisticated methods are required to fabricate a stepped grating meeting the above noted minimum requirements. Line width resolution of at least one micron (0.0004 inch) and registration accuracy of at least 0.1 micron (0.00004 inch) must be maintained, thereby demanding the use of state of the art photolithography and etching equipment.

SUMMARY OF THE INVENTION

The invention relates to the application of blazed diffraction gratings to replace the optical wedge in IRFPA OCCM applications. In a simple embodiment, at least two gratings are used. The first grating, closest to the IRFPA (within 0.050 inch) primarily deflects the incoming radiation—currently the function of the optical wedge. This grating is a replacement for the one large wedge of the prior art and includes a plurality of side by side microwedges somewhat in the shape of sawteeth which result in a first grating. This first grating, in itself, resolves the coma problem since the large displacement of rays passing therethrough from the wide end to the narrow end has been eliminated. The coma is still present in each microwedge, however it is smaller since the wedges are smaller and the coma is further cancelled out by the use of a plurality of wedges. The first grating embodies a blaze angle, $\theta$, selected (ideally) to prevent both grating and focal plane specular reflections from passing back through the system optics.

The minimum deflection angle required to assure that no reflections will re-enter the system optical bundle is defined by:

$$\phi_{min} = \tan^{-1}[(4 \times f_{sys}^2 - 1)^{-1/2} + l_{scan}/(2 \times h_{cs})]$$

where $\phi_{min}$ is the minimum allowed deflection angle, $f_{sys}$ is $1/(2 \times NA_{sys})$ where $NA_{sys}$ is defined as the sine of the half-angle of the circularly symmetric optical cone focussed at the IRFPA, $l_{scan}$ is the length of the optical scan at the IRFPA surface and $h_{cs}$ is the cold shield height. This relationship also approximately defines the minimum blaze angle required if no grating reflections can be tolerated within the optical bundle. However, the grating condition can be relaxed somewhat due to its distance from the focal plane. The new condition is that the apparent reflectivity of the grating surface(s) remain below the specified maximum reflectivity allowed for the application. Apparent reflectivity is defined as that reflectivity which would be evidenced by a flat, specular surface placed normal to the ray bundle at a focal plane. To have an acceptable apparent reflectivity, one or more of three conditions must be met by a surface not at a focal plane, these being:

1. It must be specular and tilted with respect to the optical axis by an angle greater than that of any portion of the incoming ray bundle.
2. It must be well out of focus, or
3. Its actual reflectivity must be small.

If the first condition is met, the other two have no first-order significance since no rays can reflect out of the system. If condition 1 is not met, then some rays can exit the system. For this situation to be acceptable, the reflected bundle must either be highly divergent (condition 2) or must contain little energy (condition 3).

Under these conditions the minimum blaze angle requirement is replaced by a minimum distance from the grating to the focal plane and the blaze angle can be set based upon the deflection angle. The relationship to be satisfied is $$z_{min} \approx (8 \times \delta \times f_{sys}^2/\pi) \times (r_s/r_{app})^{1/2} + F^2/Z$$

where $z_{min}$ is the minimum distance of the grating from the focal plane, $\delta$ is the design wavelength, $f_{sys}$ is the system f-number as defined hereinabove, $r_s$ is the grating surface reflectivity, $r_{app}$ is the desired apparent reflectivity, F is the system focal length and Z is the distance at which the system is focussed.

The relationship between blaze angle and deflection angle for a single grating is $$\sin \phi = n \times \sin[\theta - \sin^{-1}(\sin \theta / n)]$$

for a grating located on the upper side of the substrate and $$\sin(\phi+\theta) = n \times \sin \theta$$

if the grating is located on the lower side of the substrate, where $\theta$ is the blaze angle, $\phi$ is the deflection angle and n is the index of refraction of the grating substrate. The preferred embodiment is with the grating on the upper surface of the substrate.

Blaze height is defined by the relation $$h = \delta/(n-1)$$

where h is the blaze height, $\delta$ is the nominal wavelength for deflection and n is the index of refraction of the grating substrate. Selection of a substrate material with index of refraction near 2 will provide a blaze height requirement of about one wavelength.

Finally, grating period is defined by the relation $$p = h/\tan \theta$$

where p is the grating period, h is the blaze height and $\theta$ is the blaze angle.

The opposite face of the grating substrate may be anti-reflection coated or may support, for example, a cold filter bandpass coating, the second grating described hereinbelow or a microlens array to isolate regions of the IRFPA from irradiation, further limiting reflections. This surface must also satisfy the apparent reflectivity criteria discussed above.

The grating monochromatic aberrations are tolerable, so no correction is absolutely required. The grating chromatic aberration is quite large, however it is easily compensated by a second grating located some distance (0.020 inch to 1.0 inch) above the first grating, but still within the hermetic package (Dewar) enclosing the IRFPA. The relationship between blaze angle and reflectivity discussed above will also hold for the second grating, but in this case the distance from the focal plane can be so large that even a reasonably transmissive flat surface would be acceptable. In this embodiment, the second grating is assumed to be placed on the rear of the Dewar optical window, typically located as much as one inch above the IRFPA (about 0.95 inches above the first grating).

The relationship for the second grating blaze angle is:

$$\sin \theta_2 = \sin \theta_1 \times [(n_1-1)/(n_2-1)] \times (d_1/d_2)$$

where n is the refractive index of the substrate, d is the distance from the grating to the focal plane and subscripts "1" and "2" correspond to the first and second diffraction gratings respectively.

The relationships for the blaze height and grating pitch and the nominal wavelength are identical to those listed for the first grating.

Materials compatible with this approach from which the gratings are formed include, but are not limited to, zinc sulfide, zinc selenide, germanium, silicon, gallium arsenide, polyethylene, diamond and many other chalcogenide glasses. Materials having lower indices of refraction, such as zinc sulfide, zinc selenide or polyethylene should be chosen for the first grating to reduce the likelihood of total internal reflection due to the relatively large blaze angle of this grating.

The advantages of the invention over an optical wedge are twofold:

First, the planar nature of the blazed grating allows the implementation of arbitrarily wide scanned IRFPAs. The optical wedge is replaced with one or more blazed diffraction gratings—basically an array of wedges—which have been specifically designed to emulate the deflection behavior of the optical wedge. Since the grating thickness varies periodically by only about one wavelength over any lateral distance (no more than 0.0004 inch in this case), it will largely eliminate the monochromatic aberration produced by a simple optical wedge.

Second, replacement of a refractive element (wedge) with a diffractive element (grating) does lead to a chromatic aberration. The use of multiple, non-identical gratings spaced along the optical path above the IRFPA corrects this aberration and, in addition, eliminates the need to design a decentered optical system.

The advantages of this invention over binary optic or stepped gratings are also twofold:

First, the stepped gratings necessarily allows some fraction of incoming (or outgoing) radiation to pass undeflected, even at the design wavelength. Compared to the blazed grating, transmission efficiency of a stepped grating is reduced by the factor $$\sin c^2[\pi \times \delta_o/(N \times \delta)]$$

where N is a number of steps in the grating, $\delta_o$ is the design wavelength and $\delta$ is any wavelength in the band.

Second, the stepped grating requires repeatable, highly precise fabrication for each unit, on a scale comparable to state-of-the-art integrated circuits. The blazed gratings can be formed by mechanical means such as, for example, diamond point turning or by replication using, for example, vapor deposition, casting or embossing. These techniques do not in general require the degree of precision demanded by the stepped grating.

DESCRIPTION OF THE PREFERRED EMBODIMENT

Figure 1:
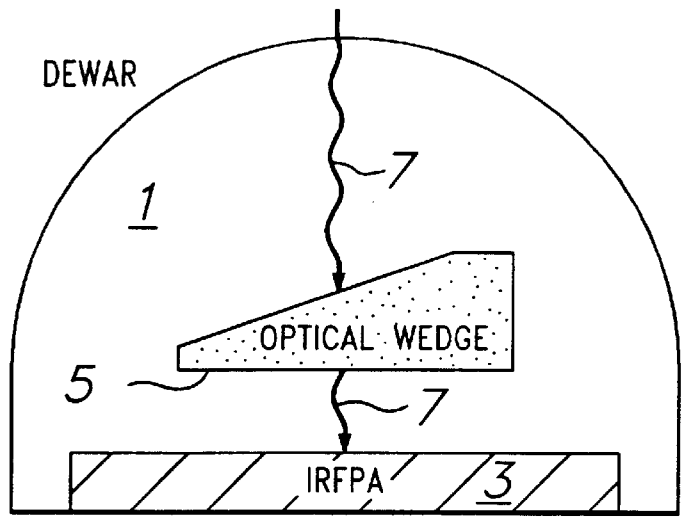
FIG. 1 is a schematic drawing of an infrared focal plane array within a Dewar with a reflection suppressing optical wedge in the optical path to the array.
Figure 2:
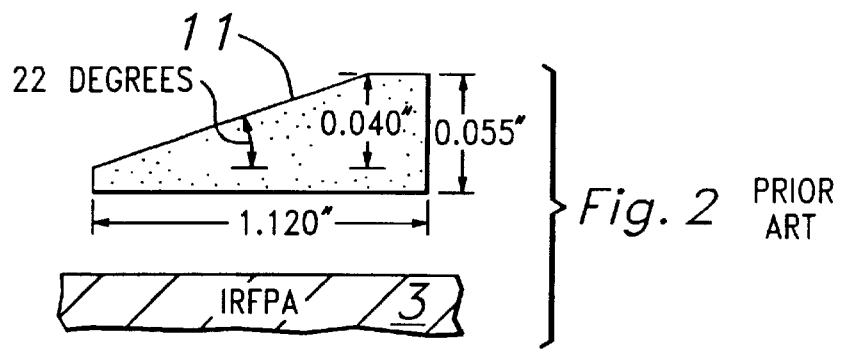
FIG. 2 is a cross section of a prior art optical wedge with typical dimensions.

Referring first to FIG. 1, there is shown a typical focal plane array arrangement including a Dewar 1 within which is disposed an IRFPA 3 with an optical wedge 5 in the optical path 7 to minimize reflection of radiation back along the optical path. The most commonly used optical wedge for minimization of reflection has been the infrared transmissive prism, a typical such prism 11 being shown in FIG. 2 spaced from the IRFPA 3. With dimensions in inches, the base has a length of 0.120, the angle of incline is −22°, the vertical distance from the bottom to the top of the incline is 0.040 and the maximum vertical height dimension is 0.055. Such prisms are generally composed of zinc sulfide. IRFPAs using the above described prism to minimize reflection have presented problems as noted hereinabove. Accordingly, in accordance with the present invention the prior art reflection suppression device is replaced with a blazed diffraction grating.

Figure 3:
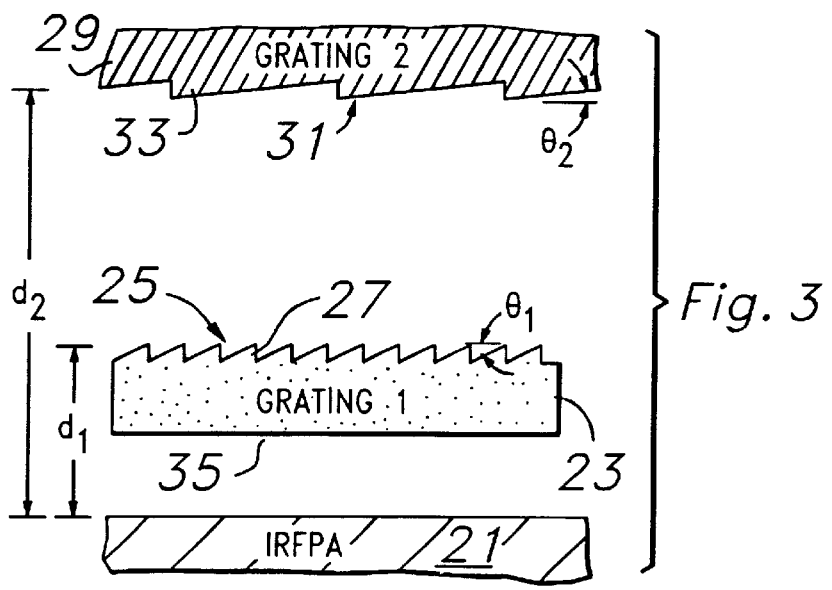
FIG. 3 is a cross section of a blazed diffraction grating which replaces the optical wedge of the prior art.

Referring now to FIG. 3, there is shown a reflection suppression grating in accordance with a first embodiment of the present invention and for a system f-number as defined hereinabove of 2.0. There is shown an IRFPA 21 with a first grating element 23 extending over the detector elements of the IRFPA and spaced from the IRFPA by a distance of 0.005 inch. The peaks of the grating portion 25 of the grating element 23 are on the side thereof remote from the IRFPA and extend a distance of 0.020 inch from the IRFPA with the height of each wedge 27 of the grating portion being 0.0003 inch and the angle of incline of each wedge 27 or $\theta_1$ being 20 degrees. A second grating element 29 is spaced from the first gating element 23 in the direction away from the IRFPA 21 and along the optical path of radiations incoming to the IRFPA. The second grating element 29 includes a grating portion 31 extending in a direction toward the grating portion 25 and has wedges 33. The distance of the peaks of the wedges 33 from the IRFPA 21 is 0.950 inch and the wedges 33 have an angle of incline of $\theta_2$ or 0.413 degrees. The grating elements 21 and 29 are preferably formed of zinc sulfide. The face 35 of the grating element 23 facing the IRFPA 21 is anti-reflection coated to improve transmission of radiation to the IRFPA.

In operation, radiation entering the Dewar 1 along the optical path 7 will pass through the grating element 29 and the grating element 23, the latter embodying a blaze angle, $\theta_1$, selected (ideally) to prevent both grating and focal plane specular reflections from passing back through the system optics. The chromatic aberration of the grating element 23, which is quite large, is compensated by the grating element 29 located above the first grating, but still within the hermetic package (Dewar) enclosing the IRFPA.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

We claim:

1. A system for suppressing reflections comprising:
   (a) a focal plane array having a radiation receiving path;
   (b) a first diffraction grating having a plurality of side by side wedges on one surface thereof, said first diffraction grating disposed in the radiation receiving path of said array; and
   (c) a second diffraction grating having a plurality of side by side wedges on one surface thereof, said second diffraction grating disposed in the radiation receiving path of said array and spaced from said first diffraction grating;
   (d) said first diffraction grating having one of a minimum blaze angle $\phi_{min}$ of $\tan^{-1}[(4\times f_{sys}^2-1)^{-1/2}+l_{scan}/(2\times h_{cs})]$ where $f_{sys}$ is the system f-number, $l_{scan}$ is the length of the optical scan at the focal plane array surface and $h_{cs}$ is the cold shield height or a minimum distance $z_{min}$ from the focal plane array of about $(8\times\delta\times f^2/\pi)\times(r_s/r_{app})^{1/2}+F^2/Z$, where $z_{min}$ is the minimum distance of the grating from the focal plane, $\delta$ is the design wavelength, f is the system f-number, $r_s$ is the grating surface reflectivity, $r_{app}$ is the desired apparent reflectivity, F is the system focal length and Z is the distance at which the system is focussed.

2. The system of claim 1 wherein said first and second diffraction gratings are disposed on opposing surfaces of a single optical element.

3. The system of claim 1 wherein the relationship defining the blaze angle of the second diffraction grating is:

$$\sin \theta_2 \approx \sin \theta_1 \times [(n_1-1)/(n_2-1)] \times (d_1/d_2)$$

where n is the refractive index of the substrate, d is the distance from the grating to the focal plane and subscripts "1" and "2" correspond to the first and second diffraction gratings respectively.

4. The system of claim 3 wherein the blaze heights of the first and second diffraction gratings are defined by the relation:

$$h=\delta/(n-1)$$

where h is the blaze height, $\delta$ is the nominal wavelength for deflection and n is the index of refraction of either grating substrate.

5. The system of claim 4 wherein the grating period is defined by the relation:

$$p=h/\tan \theta$$

where p is the grating period, h is the blaze height and $\theta$ is the blaze angle.

6. The system of claim 5 wherein said first and second diffraction gratings are disposed on opposing surfaces of a single optical element.

7. The system of claim 1 further including a first optically transmissive element including said first diffraction grating as a portion of a surface thereof and a second optically transmissive element including said second diffraction grating as a portion of a surface thereof.

8. The system of claim 7 wherein said first and second diffraction gratings are disposed on opposing surfaces of a single optical element.

9. The system of claim 7 wherein the relationship defining the blaze angle of the second diffraction grating is:

$$\sin \theta_2 \approx \sin \theta_1 \times [(n_1-1)/(n_2-1)] \times (d_1/d_2)$$

where n is the refractive index of the substrate, d is the distance from the grating to the focal plane and subscripts "1" and "2" correspond to the first and second diffraction gratings respectively.

10. The system of claim 9 wherein said first and second diffraction gratings are disposed on opposing surfaces of a single optical element.

11. The system of claim 10 wherein the blaze heights of the first and second diffraction gratings are defined by the relation:

$$h=\delta/(n-1)$$

where h is the blaze height, $\delta$ is the nominal wavelength for deflection and n is the index of refraction of either grating substrate.

12. The system of claim 11 wherein said first and second diffraction gratings are disposed on opposing surfaces of a single optical element.

13. The system of claim 11 wherein the grating period is defined by the relation:

$$p=h/\tan \theta$$

where p is the grating period, h is the blaze height and $\theta$ is the blaze angle.

14. The system of claim 13 wherein said first and second diffraction gratings are disposed on opposing surfaces of a single optical element.

15. A system for suppressing reflections comprising:

(a) a focal plane array having a radiation receiving path;

(b) a first diffraction grating having a plurality of side by side wedges on one surface thereof, said first diffraction grating disposed in the radiation receiving path of said array; and (c) a second diffraction grating having a plurality of side by side wedges on one surface thereof, said second diffraction grating disposed in the radiation receiving path of said array and spaced from said first diffraction grating;

(d) said one surfaces of said first and second diffraction gratings facing each other.

16. The system of claim 15 further including a first optically transmissive element including said first diffraction grating as a portion of a surface thereof and a second optically transmissive element including said second diffraction grating as a portion of a surface thereof.

* * * * *

UNITED STATES PATENT AND TRADEMARK OFFICE
CERTIFICATE OF CORRECTION

PATENT NO.   : 6,596,982 B1
DATED        : July 22, 2003
INVENTOR(S)  : Mark R. Skohan et al.

It is certified that error appears in the above-identified patent and that said Letters Patent is hereby corrected as shown below:

<u>Column 4,</u>
Line 29, change "where N is a number of steps" to -- where N is the number of steps --.

Signed and Sealed this

Fourteenth Day of September, 2004

JON W. DUDAS
*Director of the United States Patent and Trademark Office*